US012211432B2

(12) United States Patent
Zheng

(10) Patent No.: US 12,211,432 B2
(45) Date of Patent: Jan. 28, 2025

(54) DISPLAY PANEL AND DISPLAY APPARATUS

(71) Applicant: Tianma Advanced Display Technology Institute (Xiamen) Co.,Ltd., Xiamen (CN)

(72) Inventor: Minhui Zheng, Xiamen (CN)

(73) Assignee: Tianma Advanced Display Technology Institute (Xiamen) Co., Ltd., Xiamen (CN)

( * ) Notice: Subject to any disclaimer, the term of this patent is extended or adjusted under 35 U.S.C. 154(b) by 0 days.

(21) Appl. No.: 18/519,485

(22) Filed: Nov. 27, 2023

(65) Prior Publication Data

US 2024/0105111 A1 Mar. 28, 2024

(30) Foreign Application Priority Data

Sep. 1, 2023 (CN) ......................... 202311121882.2

(51) Int. Cl.
*G09G 3/32* (2016.01)

(52) U.S. Cl.
CPC ........... *G09G 3/32* (2013.01); *G09G 2310/08* (2013.01)

(58) Field of Classification Search
CPC ....... G09G 2310/08; G09G 2300/0809; G09G 3/32; G09G 2300/0819; G09G 2300/0842; G09G 2300/0828; G09G 2300/0857; G09G 2300/0861; G09G 2310/066; G09G 3/2014; G09G 3/3233; G09G 2310/0259
See application file for complete search history.

(56) References Cited

U.S. PATENT DOCUMENTS

| | | | | |
|---|---|---|---|---|
| 7,187,355 | B2 * | 3/2007 | Tam | G09G 3/3258 345/82 |
| 2005/0067968 | A1 * | 3/2005 | Yamashita | G09G 3/3266 315/169.3 |
| 2022/0036821 | A1 * | 2/2022 | Cong | G09G 3/3233 |

* cited by examiner

*Primary Examiner* — Muhammad N Edun
(74) *Attorney, Agent, or Firm* — Christensen O'Connor Johnson Kindness PLLC

(57) ABSTRACT

A display panel includes light-emitting elements and pixel circuits. The pixel circuit includes a comparator and a first transistor. The first transistor and the light-emitting element are electrically connected in series between a first power supply terminal and a second power supply terminal. An output terminal of the comparator is coupled to a control terminal of the first transistor. The comparator includes a first input terminal receiving a data signal, and a second input terminal receiving a step signal. The comparator is configured to compare a voltage of the data signal with a voltage of the step signal, and supply a comparison result to the control terminal of the first transistor. An operation cycle of the pixel circuit includes a light-emitting phase in which the step signal includes plateau signals and ramp signals, plateau signals are constant-voltage signals, and voltages of ramp signals progressively change over time.

20 Claims, 11 Drawing Sheets

DISPLAY PANEL AND DISPLAY APPARATUS

CROSS-REFERENCE TO RELATED DISCLOSURE

The present disclosure claims priority to Chinese Patent Application No. 202311121882.2, filed on Sep. 1, 2023, the content of which is incorporated herein by reference in its entirety.

TECHNICAL FIELD

The present disclosure relates to the field of display technologies, and in particular, to a display panel and a display apparatus.

BACKGROUND

Micro light emitting diodes (Micro-LEDs) have been widely used in the display field due to its advantages such as high brightness, low power consumption, fast response, small size, long service life, and the like. Micro-LEDs have good performance in brightness, response speed, contrast, color saturation, power consumption, and service life. However, it is unable to control the light-emitting duration of the micro-LED using the pixel circuit in the related art.

SUMMARY

In a first aspect, the present disclosure provides a display panel. The display panel includes light-emitting elements and pixel circuits. At least one of the pixel circuits includes a comparator and a first transistor, the first transistor and the light-emitting element are electrically connected between a first power supply terminal and a second power supply terminal, and an output terminal of the comparator is coupled to a control terminal of the first transistor. A first input terminal of the comparator receives a data signal, a second input terminal of the comparator receives a step signal, and the comparator is configured to compare a voltage of the data signal with a voltage of the step signal, and supply a comparison result to the control terminal of the first transistor. An operation cycle of at least one of the pixel circuits includes a light-emitting phase. In the light-emitting phase, the step signal includes at least one plateau signal and at least one ramp signal, the at least one plateau signal is a constant-voltage signal, and a voltage of the at least one ramp signal progressively changes over time.

In a second aspect, the present disclosure provides a display apparatus. The display apparatus includes a display panel. The display panel includes light-emitting elements and pixel circuits. At least one of the pixel circuits includes a comparator and a first transistor, the first transistor and the light-emitting element are electrically connected between a first power supply terminal and a second power supply terminal, and an output terminal of the comparator is coupled to a control terminal of the first transistor. A first input terminal of the comparator receives a data signal, a second input terminal of the comparator receives a step signal, and the comparator is configured to compare a voltage of the data signal with a voltage of the step signal, and supply a comparison result to the control terminal of the first transistor. An operation cycle of at least one of the pixel circuits includes a light-emitting phase. In the light-emitting phase, the step signal includes at least one plateau signal and at least one ramp signal, the at least one plateau signal is a constant-voltage signal, and a voltage of the at least one ramp signal progressively changes over time.

BRIEF DESCRIPTION OF DRAWINGS

In order to more clearly illustrate technical solutions of embodiments of the present disclosure, the drawings to be used in the embodiments will be briefly described below. The drawings in the following description are some embodiments of the present disclosure. For those skilled in the art, other drawings may also be obtained based on these drawings.

DESCRIPTION OF EMBODIMENTS

In order to better understand technical solutions of the present disclosure, the embodiments of the present disclosure are described in details with reference to the drawings.

It should be clear that the described embodiments are merely part of the embodiments of the present disclosure rather than all of the embodiments. All other embodiments obtained by those skilled in the art shall fall into the protection scope of the present disclosure.

The terms used in the embodiments of the present disclosure are merely for the purpose of describing embodiments, rather than limiting the present disclosure. The terms "a", "an", "the" and "said" in a singular form in the embodiment of the present disclosure and the attached claims are also intended to include plural forms thereof, unless noted otherwise.

It should be understood that the term "and/or" used in the context of the present disclosure is to describe a correlation relation of related objects, indicating that there may be three relations, e.g., A and/or B may indicate only A, both A and B, and only B. In addition, the symbol "/" in the context generally indicates that the relation between the objects in front and at the back of "/" is an "or" relationship.

It should be understood that although the terms 'first' and 'second' may be used in the present disclosure to describe XX, these XX should not be limited to these terms. These terms are used only to distinguish the XX from each other. For example, without departing from the scope of the embodiments of the present disclosure, a first XX may also be referred to as a second XX. Similarly, the second XX may also be referred to as the first XX.

Embodiments of the present disclosure provide a display panel. The display panel includes a pixel circuit. The pixel circuit includes a comparator and a step signal. The step signal includes at least one plateau signal and at least one ramp signal. The comparator compares a voltage of a data signal with a voltage of the step signal. On-off state of a first transistor is controlled based on the comparison result of the comparator, such that the turn-on duration of the first transistor is controlled. Accordingly, a light-emitting duration of a light-emitting element is controlled, achieving flexible control of the light-emitting duration of the light-emitting element.

Embodiments of the present disclosure provide a display panel. The display panel includes a plurality of light-emitting elements and a plurality of pixel circuits. Each light-emitting element is coupled one corresponding pixel circuit. The pixel circuit is configured to drive the light-emitting element to emit light. The light-emitting element may be an inorganic light-emitting diode, such as a Micro-LED, a Mini-LED, and the like.

Figure 1:
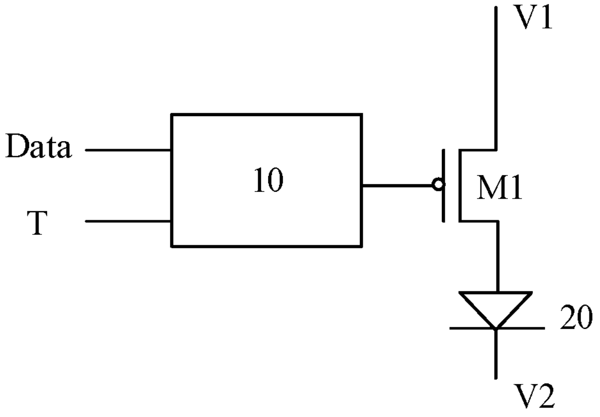
FIG. 1 is a schematic diagram of a pixel circuit according to some embodiments of the present disclosure.

FIG. 1 is a schematic diagram of a pixel circuit according to some embodiments of the present disclosure. As shown in FIG. 1, the pixel circuit includes a comparator 10 and a first transistor M1. The first transistor M1 and a light-emitting element 20 are electrically connected between a first power supply terminal V1 and a second power supply terminal V2. The first transistor M1 includes a first terminal coupled to the first power supply terminal V1, and a second terminal coupled to a first electrode of the light-emitting element 20. A second electrode of the light-emitting element 20 is coupled to the second power supply terminal V2. The first power supply terminal V1 provides a positive power supply voltage, and the second power supply terminal V2 provides a negative power supply voltage. An output terminal of the comparator 10 is coupled to the control terminal of the first transistor M1. In other words, the on-off state of the first transistor M1 is controlled by a signal outputted by the output terminal of the comparator 10. In some embodiments of the present disclosure, the first transistor M1 is a P-type transistor, and an active layer of the first transistor M1 includes silicon.

The comparator 10 includes a first input terminal and a second input terminal. The first input terminal receives a data signal Data. The second input terminal receives a step signal T. The comparator 10 compares a voltage of the data signal Data with a voltage of the step signal T, and supplies a comparison result to the control terminal of the first transistor M1.

Figure 2:
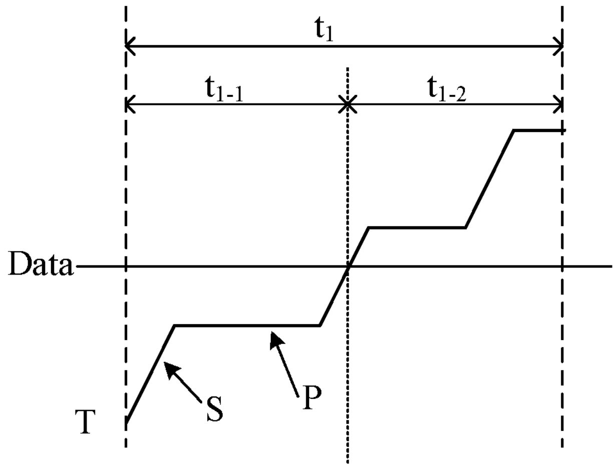
FIG. 2 is a timing sequence diagram of a light-emitting phase according to some embodiments of the present disclosure.

An operation cycle of the pixel circuit includes a light-emitting phase. When the display panel displays, the operation cycle of the pixel circuit is fixed, and the duration of the light-emitting phase is also fixed. FIG. 2 is a timing sequence diagram of a light-emitting phase according to some embodiments of the present disclosure. As shown in FIG. 2, in the light-emitting phase $t_1$, the step signal T includes at least one plateau signal P and at least one ramp signal S. The plateau signal P is a constant-voltage signal. The voltage of the ramp signal S progressively changes over time. FIG. 2 illustrates an example in which the step signal T includes 3 plateau signals P and 3 ramp signals S, but the present disclosure is not limited thereto.

When the voltage of the data signal Data is greater than the voltage of the step signal T, the signal outputted by the output terminal of the comparator 10 turns on the first transistor M1. When the voltage of the data signal Data is smaller than the voltage of the step signal T, the signal outputted by the output terminal of the comparator 10 turns off the first transistor M1. When the first transistor M1 is turned on, the voltage of the first power supply terminal V1 is applied to the first electrode of the light-emitting element 20, and the light-emitting element 20 is driven to emit light. The light-emitting duration of the light-emitting element 20 depends on the turn-on duration of the first transistor M1. The longer the turn-on duration of the first transistor M1 is, the longer the light-emitting duration of the light-emitting element 20 will be. The light-emitting duration of the light-emitting element 20 is controlled by controlling the turn-on duration of the first transistor M1. The longer the light-emitting duration of the light-emitting element 20 is, the greater the brightness of the light-emitting element 20 will be. The greyscale displayed by the light-emitting element 20 is associated with the light-emitting duration of the light-emitting element 20. By adjusting the light-emitting duration of the light-emitting element 20, the light-emitting element 20 can display various greyscales.

FIG. 2 shows the light-emitting period $t_{1-1}$ and the non-light-emitting period $t_{1-2}$ in the light-emitting phase $t_1$. In the light-emitting period $t_{1-1}$, the voltage of the data signal Data is greater than the voltage of the step signal T, the first transistor M1 is turned on, and the light-emitting element 20 emits light. In the non-light-emitting period $t_{1-2}$, the voltage of the data signal Data is smaller than the voltage of the step signal T, the first transistor M1 is turned off, and the light-emitting element 20 does not emit light.

FIG. 2 shows the data signal Data and the step signal T in the light-emitting period $t_{1-1}$ and the non-light-emitting period $t_{1-2}$ in the light-emitting phase $t_1$. In some embodiments of the present disclosure, when the voltage of the data signal Data is large sufficiently, the voltage of the data signal Data is greater than the voltage of the step signal T in the whole light-emitting phase $t_1$, and the whole light-emitting phase $t_1$ is the light-emitting period $t_{1-1}$.

Figure 3:
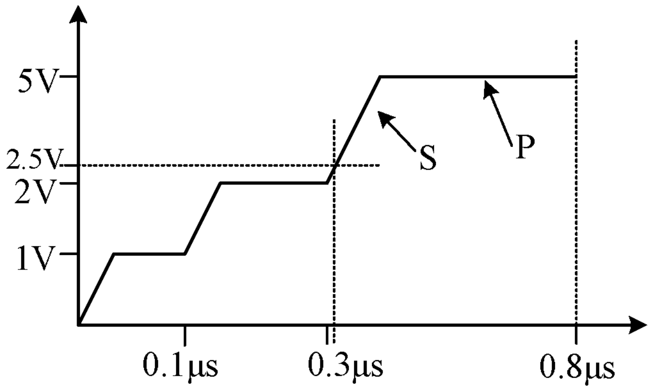
FIG. 3 is a schematic diagram of a step signal according to some embodiments of the present disclosure.

One step signal T is taken as an example, and how to adjust the light-emitting duration using the step signal T is briefly described in the following embodiments. FIG. 3 is a diagram showing a step signal according to some embodiments of the present disclosure. For example, the duration of the light-emitting phase in the operation cycle of the pixel circuit is 0.8 μs, and the step signal T increases from 0V to 5V in the 0.8 μs. When the data signal Data is 2.5V, the voltage of the data signal Data is greater than the voltage of the step signal T in the time period from 0 to 0.32 μs, and the comparator 10 turns on the first transistor M1. In the time period from 0.33 μs to 0.8 μs, the voltage of the data signal Data is smaller than the voltage of the step signal T, and the comparator 10 turns off the first transistor M1. That is, in the light-emitting phase of 0.8 μs, the light-emitting duration of the light-emitting element 20 is 0.32 μs.

FIG. 3 shows an example in which the step signal T includes 3 plateau signals P and 3 ramp signals S. The voltage of the first plateau signal P is 1V, the voltage of the second plateau signal P is 2V, and the voltage of the third plateau signal P is 5V. When the voltage of the data signal Data is still 2.5V, the duration in which the step signal T is smaller than 2.5V can be increased by increasing the duration of the first or second plateau signal P without adjusting the change rule of the ramp signal S. Accordingly, the light-emitting duration of the light-emitting element 20 is increased, and the light-emitting duration of the light-emitting element is controlled by adjusting the step signal T.

In some embodiments of the present disclosure, the light-emitting duration of the light-emitting element 20 may be adjusted by adjusting the ramp signal S. FIG. 3 shows an example in which the voltage of the ramp signal S is linear with time. By adjusting the slop (the ramping rate) of the third ramp signal S in FIG. 3, the duration in which the step signal T is smaller than 2.5V is increased. In this way, the data signal Data is still 2.5V, the light-emitting duration of the light-emitting element 20 can be increased.

The pixel circuit in the display panel according to some embodiments of the present disclosure includes a comparator 10. The comparator 10 is configured to compare a voltage of the data signal Data with a voltage of the step signal T, and supply a comparison result to the control terminal of the first transistor M1 to control the on-off state of the first transistor M1. The light-emitting duration of the light-emitting element 20 can be controlled by the turn-on duration of the first transistor M1. The step signal T includes at least one plateau signal P and at least one ramp signal S. The plateau signal P is a constant-voltage signal. The constant-voltage signal is easy to generate, and the duration of the constant-voltage signal is easy to control. The light-emitting duration of the light-emitting element 20 can be adjusted by adjusting the duration of the plateau signal P. The change rule of the voltage of the ramp signal S as a function of time is configured. In this way, the light-emitting duration can be adjusted using the ramp signal S, and switching between the light-emitting period and the non-light-emitting period can be achieved using the ramp signal S. In some embodiments of the present disclosure, the duration of the light-emitting element 20 can be simply and flexibly adjusted through the cooperation of the plateau signal P and the ramp signal S.

In addition, in some embodiments of the present disclosure, the light-emitting duration of the light-emitting element 20 can be adjusted by adjusting the duration of the plateau signal P. The longer the duration of the plateau signal P is, the longer the light-emitting duration of the light-emitting element 20 will be. The greater the brightness is, and the higher the greyscale will be. That is, by adjusting the duration of the plateau signal P, the light-emitting duration is adjusted, and the greyscale is controlled. In the present disclosure, the light-emitting duration is easily controlled using the plateau signal P. By configuring the step signal T to include multiple plateau signals P, the light-emitting duration may have more values, the greyscale may have more values, enriching colors of the display panel.

Figure 4:
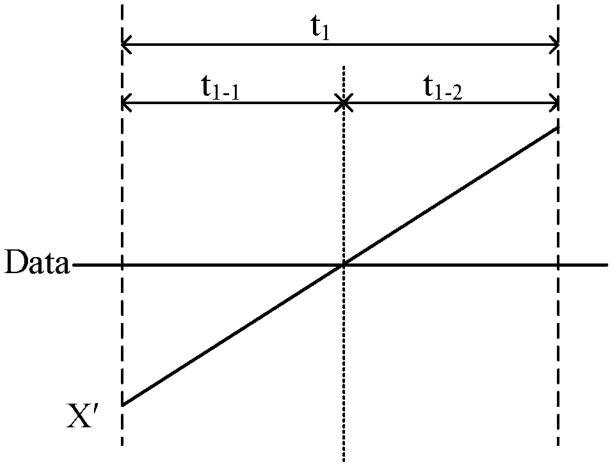
FIG. 4 is a timing sequence diagram of a light-emitting phase according to the related art.

In a related art, the light-emitting duration of the light-emitting element is controlled using the ramp signal that linearly changes over time. FIG. 4 is a timing sequence diagram of a light-emitting phase in the related art. As shown in FIG. 4, a ramp signal X' is provided. The period when the voltage of the data signal Data is greater than the voltage of the ramp signal X' is the light-emitting period $t_{1-1}$. In this period, the light-emitting element is controlled to emit light. The period when the voltage of the data signal Data is smaller than the voltage of the ramp signal X' is the non-light-emitting period $t_{1-2}$. In this period, the light-emitting element does not emit light. In the related art, the voltage of the ramp signal X' in the light-emitting phase $t_1$ linearly changes over time. The light-emitting duration of the light-emitting element is controlled by adjusting the slope of the ramp signal X'. In addition, the ramp signal X' further needs to satisfy the requirements for the light-emitting duration under different greyscales. The generation of such linearly-changed signal is complicated.

In some embodiments of the present disclosure, the step signal T includes at least one plateau signal P and at least one ramp signal S. Compared with the ramp signal X', the plateau signal P is easier to be generated, and the duration of the plateau signal P is easier to be controlled. The light-emitting duration of the light-emitting element 20 is adjusted by adjusting the duration of the plateau signal P, so the control of the light-emitting duration is more flexible and easier to achieve.

In some embodiments of the present disclosure, the display panel further includes a drive chip. The drive chip includes a signal generation circuit. The signal generation circuit is configured to generate the step signal T. For example, the signal generation circuit converts a digital signal to an analog signal so as to generate the step signal T. In some embodiments of the present disclosure, in a display apparatus, the signal generation circuit generates, according to a data signal transmitted by a central controlling circuit, the step signal T using operations such as Fourier transforming.

In some embodiments of the present disclosure, in the light-emitting phase $t_1$, the step signal T includes n plateau signals P and m ramp signals S, in which m and n are both positive integers, n≥2, and m≥2; n may be equal to m or may be different from m. The plateau signal P is successive with at least one ramp signal S. By adjusting the duration of the plateau signal P, the light-emitting duration of the light-emitting element 20 can be adjusted. By configuring the change rule of the voltage of the ramp signal S as a function of time, the light-emitting duration is also adjusted. In addition, switching between the light-emitting period and the non-light-emitting period can be achieved using the ramp signal S. With the plateau signal P and the ramp signal S, the duration of the light-emitting element 20 can be simply and flexibly adjusted. The step signal T includes more plateau signals P, the light-emitting duration may have more values, and the greyscale of the light-emitting element 20 may have more values, enriching colors of the display panel.

In some embodiments of the present disclosure, in the light-emitting phase, the step signal T may have a plurality of candidate waveforms. The candidate waveforms of the step signal T are described below with examples.

Figure 5:
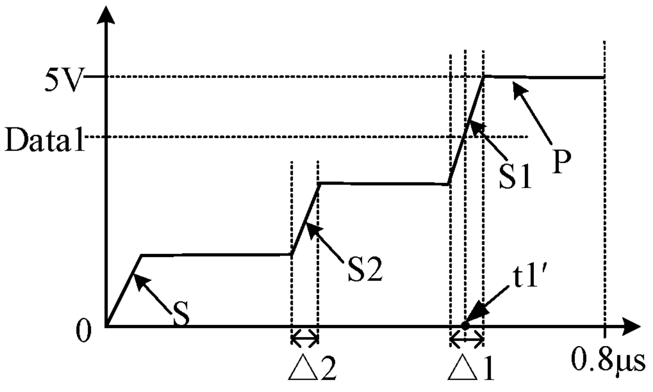
FIG. 5 is a schematic diagram of another step signal according to some embodiments of the present disclosure.

In some embodiments of the present disclosure, the voltages of the n plateau signals successively increase over time. FIG. 5 is a schematic diagram of another step signal according to some embodiments of the present disclosure. FIG. 5 shows the waveform of the step signal T in the light-emitting phase. In the example shown in FIG. 5, the step signal T includes 3 plateau signals P and 3 ramp signals S. That is, n=m=3. As shown in FIG. 5, in the light-emitting phase with a duration of 0.8 μs, the step signal T increases from 0V to 5V. The voltage values of the 3 plateau signals P successively increase over time. The voltage of the data signal Data is greater than 0V. When the pixel circuit employs the step signal T provided in the embodiment of FIG. 5, the initial period of the light-emitting phase is the light-emitting period, and a next period is the non-light-emitting period. That is, the light-emitting element 20 first emits light, and then does not emit light. The voltage value of the data signal Data is larger, the ratio of the duration of the light-emitting period to the duration of the light-emitting phase is larger, and the light-emitting duration of the light-emitting element 20 is longer.

Figure 6:
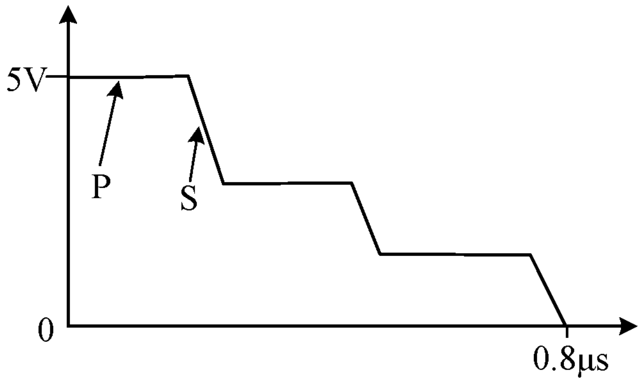
FIG. 6 is a schematic diagram of another step signal according to some embodiments of the present disclosure.

In some embodiments of the present disclosure, the voltages of the n plateau signals successively decrease over time. FIG. 6 is a schematic diagram of another step signal according to some embodiments of the present disclosure. In the example shown in FIG. 6, the step signal T includes 3 plateau signals P and 3 ramp signals S. That is, n=m=3. As shown in FIG. 6, in the light-emitting phase with a duration of 0.8 μs, the step signal T decreases from 5V to 0V. The voltage values of the 3 plateau signals P successively decrease over time. The voltage of the data signal Data is greater than 0V. When the pixel circuit employs the step signal T provided in the embodiment of FIG. 6, the initial period of the light-emitting phase is the non-light-emitting period, and a next period is the light-emitting period. That is, the light-emitting element 20 first does not emit light, and then emits light. The voltage value of the data signal Data is larger, the non-light-emitting period in the initial period of the light-emitting phase is shorter, the subsequent light-emitting period is longer, and the light-emitting duration of the light-emitting element 20 is longer.

Figure 7:
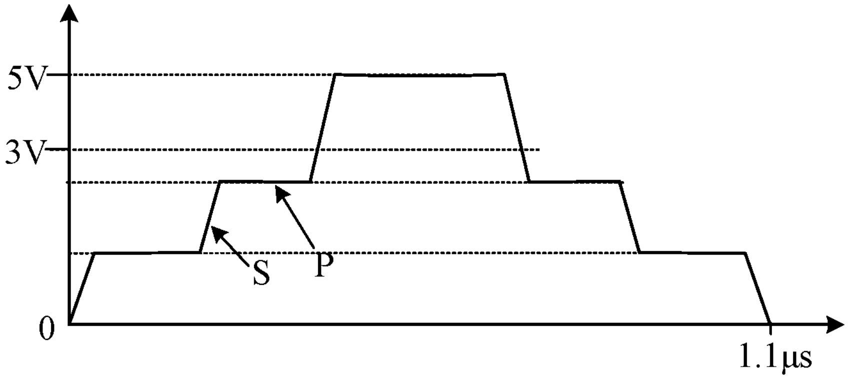
FIG. 7 is a schematic diagram of another step signal according to some embodiments of the present disclosure.

In some embodiments of the present disclosure, the voltages of the n plateau signals successively increase and then successively decrease over time. FIG. 7 is a schematic diagram of another step signal according to some embodiments of the present disclosure. FIG. 7 shows a step signal T that includes 5 plateau signals P and 6 ramp signals S in the light-emitting phase. As shown in FIG. 7, in the light-emitting phase with a duration of 1.1 μs, the step signal T first increases from 0V to 5V, and then decreases from 5V to 0V. The voltage values of the 5 plateau signals P successively increase and then successively decrease over time. The voltage value of the data signal Data is 3V for example. When the pixel circuit employs the step signal T provided in the embodiment of FIG. 7, the initial period of the light-emitting phase is the light-emitting period, the subsequent period is the non-light-emitting period, and the further subsequent period is the light-emitting period. That is, the light-emitting element 20 first emits light, and then does not emit light, and then emits light again. The light-emitting duration of the light-emitting element 20 is equal to the sum of the durations of the two light-emitting periods.

The waveform of the step signal T provided in the embodiment of FIG. 7 may be a symmetrical waveform. That is, the second plateau signal P and the fourth plateau signal P are identical in voltage and duration, and the first plateau signal P and the fifth plateau signal P are identical in voltage and duration. With this arrangement, the two light-emitting periods in the light-emitting phase have the equal duration, and the waveform of the step signal T is symmetrical. The step signal T has a strong regularity, and its generation method is simple.

In some embodiments of the present disclosure, the step signal T provided in the embodiment of FIG. 7 and including n plateau signals with voltage values successively increase and then successively decrease may have an asymmetrical waveform.

Figure 8:
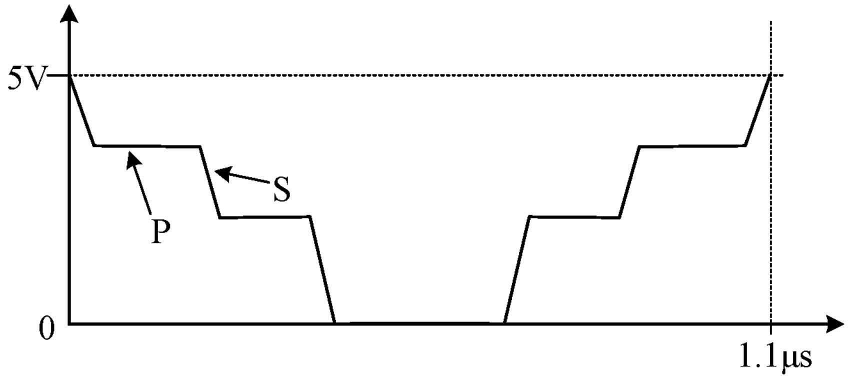
FIG. 8 is a schematic diagram of another step signal according to some embodiments of the present disclosure.

In some embodiments of the present disclosure, the voltages of the n plateau signals successively decrease and then successively increase over time. FIG. 8 is a schematic diagram of another step signal according to some embodiments of the present disclosure. FIG. 8 shows a step signal T that includes 5 plateau signals P and 6 ramp signals S in the light-emitting phase. As shown in FIG. 8, in the light-emitting phase with a duration of 1.1 μs, the step signal T first decreases from 5V to 0V, and then increases from 0V to 5V. The voltage values of the 5 plateau signals P successively decrease and then successively increase over time. When the pixel circuit employs the step signal T provided in the embodiment of FIG. 8, the initial period of the light-emitting phase is the non-light-emitting period, the subsequent period is the light-emitting period, and the further subsequent period is the non-light-emitting period. That is, the light-emitting element 20 first does not emit light, and then emits light, and then does not emit light again.

The waveform of the step signal T provided in the embodiment of FIG. 8 may be a symmetrical waveform or may be an asymmetrical waveform.

Figure 9:
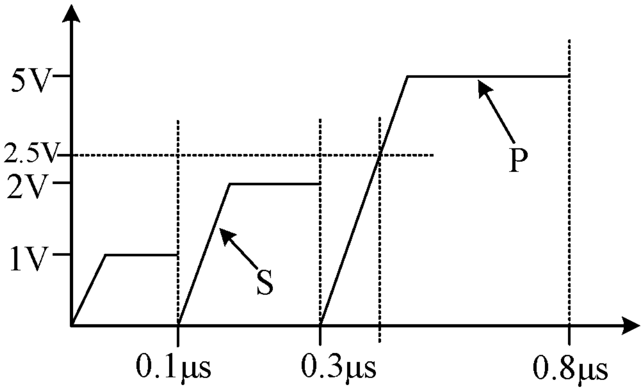
FIG. 9 is a schematic diagram of another step signal according to some embodiments of the present disclosure.

FIG. 9 is a schematic diagram of another step signal according to some embodiments of the present disclosure. In some embodiments of the present disclosure, as shown in FIG. 9 (for example, n=3), the voltage values of the 3 plateau signals successively increase over time, the ramp signals S are in one-to-one correspondence with the plateau signals P, and each ramp signal S increases from 0V to the voltage of the corresponding plateau signal P. The voltage value of the data signal Data is 2.5V for example. When the pixel circuit employs the step signal T provided in the embodiment of FIG. 9, in the durations of the first two plateau signals P, the durations of the first two ramp signals S, and a part of the duration of the third ramp signal S, the voltage of the step signal P is smaller than 2.5V, and the light-emitting element 20 emits light. These periods are the light-emitting period. The other part of the duration of the third ramp signal S and the duration of the third plateau signal P constitute the non-light-emitting period.

Figure 10:
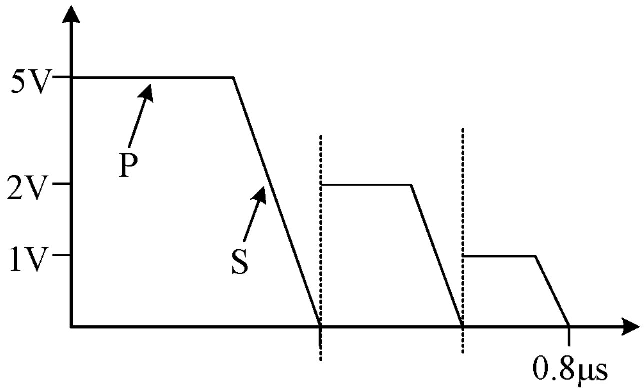
FIG. 10 is a schematic diagram of another step signal according to some embodiments of the present disclosure.

FIG. 10 is a schematic diagram of another step signal according to some embodiments of the present disclosure. In some embodiments of the present disclosure, as shown in FIG. 10 (for example, n=3), the voltage values of the 3 plateau signals successively decrease over time, the ramp signals S are in one-to-one correspondence with the plateau signals P, and each ramp signal S decreases from the voltage of the corresponding plateau signal P to 0V. When the pixel circuit employs the step signal T provided in the embodiment of FIG. 10, generally, in the light-emitting phase, the first is the non-light emitting period, and then is the light emitting period.

In some embodiments of the present disclosure, q ramp signals in the step signal T have a same voltage-time function, q is a positive integer, and $q \leq m$. By arranging the q ramp signals S to have the same regularity, the q ramp signals S can be generated in the same method, and thus the step signal T is easier to be generated. In some embodiments of the present disclosure, all the ramp signals S in the step signal T have the same voltage-time function. In this way, all the ramp signals S can be generated in the same method. For example, in the embodiment of FIG. 5, the voltages of the 3 ramp signals S have a linear relationship with time, the voltage-to-time linear correlation coefficients of the 3 ramp signals S are the same, and the durations of the 3 ramp signals S may be different.

Figure 11:
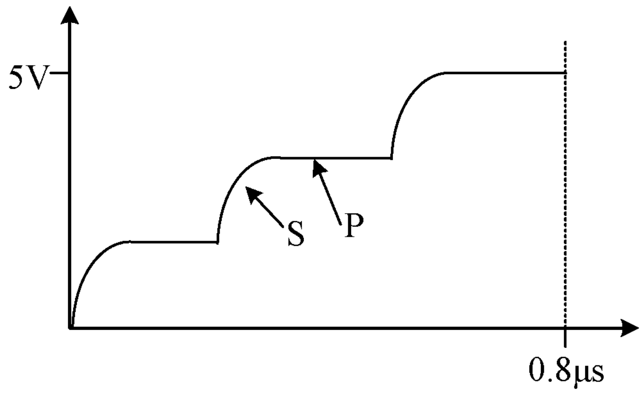
FIG. 11 is a schematic diagram of another step signal according to some embodiments of the present disclosure.

In some embodiments of the present disclosure, the voltage-time function of the ramp signal S may be nonlinear. FIG. 11 is a schematic diagram of another step signal according to some embodiments of the present disclosure. As shown in FIG. 11, the voltage-time function of the ramp signal S is nonlinear, and the 3 ramp signals have the same voltage-time function.

In some embodiments of the present disclosure, as shown in FIG. 5, the ramp signals S include a first ramp signal S1 and a second ramp signal S2. The duration of the first ramp signal S1 is Δ1, and the duration of the second ramp signal S2 is Δ2. As shown in FIG. 5, Δ1 is greater than Δ2. In some embodiments of the present disclosure, the ramp signal S is not only used to adjust the light-emitting duration, but is also used to achieve the switching between the light-emitting period and the non-light-emitting period. As shown in FIG. 5, the voltage of the data signal Data is within the change range of the first ramp signal S1, and the time point t1' is switching point of the light-emitting period and the non-light-emitting period. Providing the data signal Data1 to the pixel circuit can control the light-emitting element 20 to have a certain light-emitting duration, such that the light-emitting element 20 displays a greyscale. It is noted that the second ramp signal S2 also can be used to adjust the light-emitting duration so as to cause the light-emitting element 20 to display greyscales. In some embodiments of the present disclosure, the step signal T may include ramp signals S having different durations, satisfying different greyscales' requirements for light-emitting durations.

Figure 12:
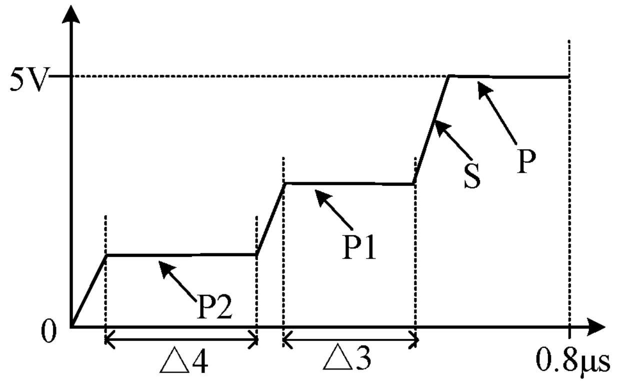
FIG. 12 is a schematic diagram of another step signal according to some embodiments of the present disclosure.

FIG. 12 is a schematic diagram of another step signal according to some embodiments of the present disclosure. In some embodiments of the present disclosure, as shown in FIG. 12, the n plateau signals P include a first plateau signal P1 and a second plateau signal P2, the voltage value of the first plateau signal P1 is different from that of the second plateau signal P2, and the duration of the first plateau signal P1 is different from that of the second plateau signal P2. The plateau signal P is a constant-voltage signal. The plateau signal P is used to adjust the light-emitting duration. The voltage value of the first plateau signal P1 and the voltage value of the second plateau signal P2 are different, so the first plateau signal P1 and the second plateau signal P2 are respectively used to adjust light-emitting durations of different data signals Data. For example, the first plateau signal P1 is greater than the second plateau signal P2. When the voltage value of the first data signal is between the voltage value of the first plateau signal P1 and the voltage value of the second plateau signal P2, the light-emitting duration of the light-emitting element 20 under the first data signal can be adjusted by adjusting the duration of the second plateau signal P2. When the voltage value of the second data signal is greater than the voltage value of the first plateau signal P1, the duration of the second plateau signal P2 does not change, and the light-emitting duration of the light-emitting element 20 under the second data signal can be adjusted by adjusting the duration of the first plateau signal P1. The first plateau signal P1 and the second plateau signal P2 correspond to different greyscales. With such an arrangement, the requirements of different greyscales for the light-emitting durations of the light-emitting element 20 can be satisfied.

As shown in FIG. 12, the voltage value of the first plateau signal P1 is greater than the voltage value of the second plateau signal P2, the duration of the first plateau signal P1 is Δ3, the duration of the second plateau signal P2 is Δ4, and Δ3 is smaller than Δ4. The plateau signal P in the step signal T may be configured in such a manner that the larger the voltage value of the plateau signal P is, the shorter the duration of the plateau signal P is. When the voltage of the data signal Data is greater than the voltage of the step signal T, the first transistor M1 is turned on, and the light-emitting element 20 is driven to emit light. When the voltage of the data signal Data is smaller than the voltage of the step signal T, the first transistor M1 is turned off, and the light-emitting element 20 does not emit light. The data signal Data corresponds to the greyscale level. The voltage value of the data signal Data is greater, it requires the light-emitting duration of the light-emitting element 20 to be longer, and the light-emitting element 20 displays a higher greyscale level. For example, when the voltage value of the second data signal is greater than the voltage value of the first plateau signal P1, the duration of the second plateau signal P2 and the duration when the voltage of the ramp signal S is smaller than the voltage of the first plateau signal P1 belong to the light-emitting period. Setting the duration of the first plateau signal P1 to be smaller than that of the second plateau signal P2 can also satisfy the requirement for the light-emitting duration under the second data signal. In this way, with the duration of the light-emitting phase being fixed, by providing more plateau signals P in the step signal T, the light-emitting element 20 can display more greyscale levels, and the display panel can display richer colors.

In some embodiments of the present disclosure, the light-emitting elements 20 include a first light-emitting element and a second light-emitting element that are different in color, and the step signals T include a first step signal and a second step signal. The first step signal and the second step signal have different waveforms. The pixel circuit coupled to the first light-emitting element receives the first step signal. The pixel circuit coupled to the second light-emitting element receives the second step signal. The light-emitting elements 20 of different colors have different light-emitting efficiencies. The light-emitting elements 20 of different colors are configured with their respective step signals T. The light-emitting durations of the light-emitting elements 20 of different colors are adjusted using their corresponding step signals T. In this way, the requirements for light-emitting durations under different greyscales are satisfied for various colors of light-emitting elements 20.

The display panel includes red light-emitting elements, blue light-emitting elements, and green light-emitting elements. In some embodiments of the present disclosure, the red light-emitting elements, the blue light-emitting elements, and the green light-emitting elements are configured with their corresponding step signals T.

Figure 13:
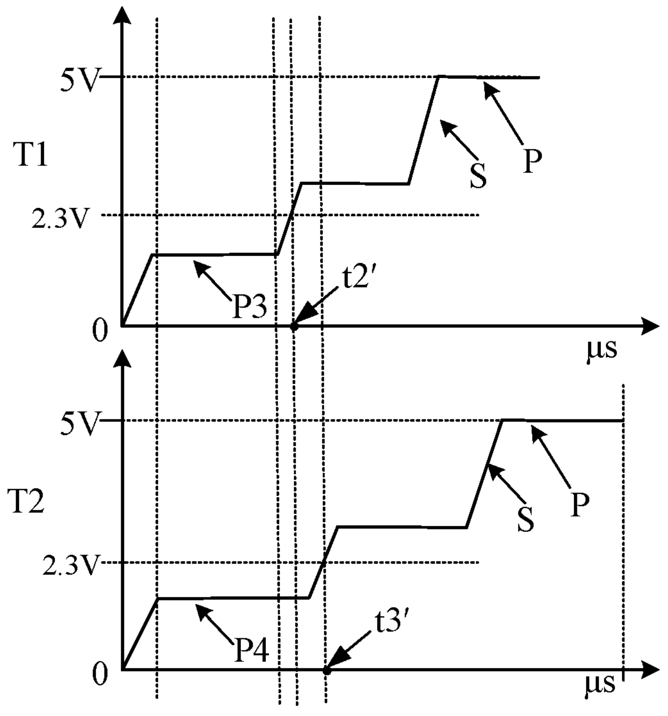
FIG. 13 is a schematic diagram of another step signal according to some embodiments of the present disclosure.

FIG. 13 is a schematic diagram of another step signal according to some embodiments of the present disclosure. FIG. 13 shows a first step signal T1 and a second step signal T2. In some embodiments of the present disclosure, as shown in FIG. 13, the plateau signals of the first step signal T1 include a third plateau signal P3, and the plateau signals of the second step signal T2 include a fourth plateau signal P4. The voltage value of the third plateau signal P3 and the voltage value of the fourth plateau signal P4 are equal. The duration of the third plateau signal P3 and the duration of the fourth plateau signal P4 are different. The voltage value of the data signal Data is, for example, 2.3V. As shown in FIG. 13, when the first step signal T1 is supplied to the pixel circuit, the switching point between the light-emitting period and the non-light-emitting period is the time point t2', and when the second step signal T2 is supplied to the pixel circuit, the switching point between the light-emitting period and the non-light-emitting period is the time point t3'. The time point t2' is prior to the time point t3'. The third plateau signal P3 and the fourth plateau signal P4 are configured with different durations, so the first light-emitting element and the second light-emitting element have different light-emitting durations under the same data voltage Data. When the first light-emitting element and the second light-emitting element have different emission efficiencies, this arrangement of embodiments of the present disclosure can achieve that the same data voltage Data can cause light-emitting elements of different colors to display the same greyscale. In this way, the light-emitting elements of different colors can be driven using the same correspondence relationship between the data voltage and the greyscale, thereby simplifying the driving mode of the display panel.

In some embodiments of the present disclosure, the light-emitting efficiency of the first light-emitting element is greater than the light-emitting efficiency of the second light-emitting element. As shown in FIG. 13, the duration of the third plateau signal P3 is smaller than the duration of the fourth plateau signal P4. For example, the voltage value of the data signal Data is 2.3V. The first step signal T1 is supplied to the pixel circuit corresponding to the first light-emitting element, and the light-emitting duration of the first light-emitting element is t2'. The second step signal T2 is supplied to the pixel circuit corresponding to the second light-emitting element, and the light-emitting duration of the second light-emitting element is t3'. t2' is smaller than t3'. The light-emitting efficiency difference between light-emitting elements is compensated by increasing the duration of the plateau signal. In this way, with the same data voltage Data, the light-emitting elements of different colors display the same greyscale. Therefore, the light-emitting elements of different colors can be driven using the same correspondence relationship between the data voltage and the greyscale, simplifying the driving mode of the display panel.

Figure 14:
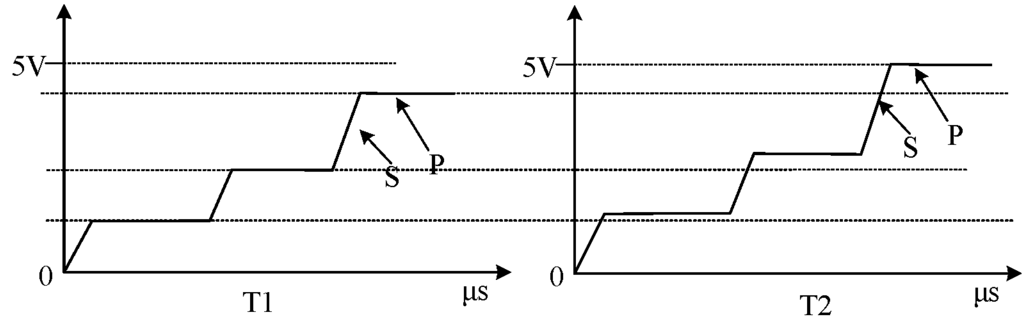
FIG. 14 is a schematic diagram of another step signal according to some embodiments of the present disclosure.

FIG. 14 is a schematic diagram of another step signal according to some embodiments of the present disclosure. FIG. 14 shows the first step signal T1 and the second step signal T2. In some embodiments of the present disclosure, as shown in FIG. 14, the number of plateau signals in the first step signal T1 is equal to the number of plateau signals in the second step signal T2. For example, n=3. The voltage value of the $i^{th}$ plateau signal P in the first step signal T1 is different from the voltage value of the $i^{th}$ plateau signal P in the second step signal T2, where i is a positive integer, and i≥1. FIG. 14 shows an example that voltage value of the $i^{th}$ plateau signal Pin the first step signal T1 is different from the voltage value of the $i^{th}$ plateau signal P in the second step signal T2. With such an arrangement, the first light-emitting element and the second light-emitting element have different light-emitting durations when being driven by the same data voltage Data. In this way, the light-emitting efficiency difference of the light-emitting elements is compensated, and the light-emitting elements of different colors can display the same greyscale level when driven be the same data voltage Data. Therefore, the light-emitting elements of different colors can be driven using the same correspondence relationship between the data voltage and the greyscale, simplifying the driving mode of the display panel.

Figure 15:
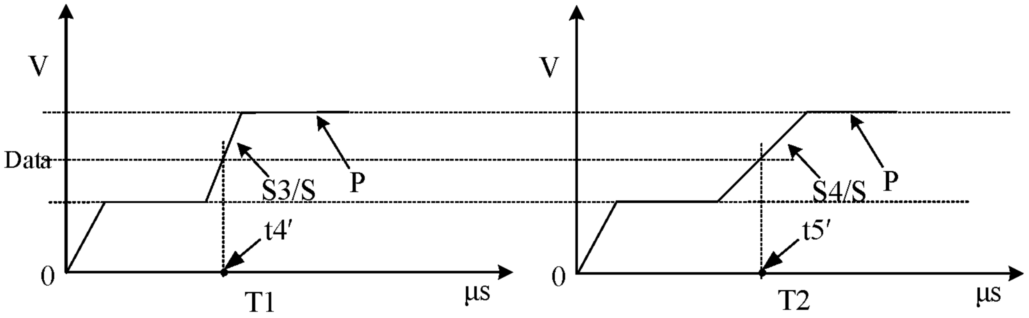
FIG. 15 is a schematic diagram of another step signal according to some embodiments of the present disclosure.

FIG. 15 is a schematic diagram of another step signal according to some embodiments of the present disclosure. FIG. 15 shows a first step signal T1 and a second step signal T2. In some embodiments of the present disclosure, as shown in FIG. 15, the ramp signals S include a third ramp signal S3 and a fourth ramp signal S4. The first step signal T1 includes the third ramp signal S3, and the second step signal T2 includes the fourth ramp signal S4. The change rate of the voltage of the third ramp signal S3 over time is greater than the change rate of the voltage of the fourth ramp signal S4 over time. When the voltage value of the data voltage Data is within the changing range of the third ramp signal S3 and the fourth ramp signal S4, the first step signal T1 is supplied to the pixel circuit, and the switching point between the light-emitting period and the non-light-emitting period is the time point t4', and the second step signal T2 is supplied to the pixel circuit, and the switching point between the light-emitting period and the non-light-emitting period is the time point t5'. As shown in FIG. 15, t4' is earlier than the t5'. That is, the light-emitting duration of the first light-emitting element is smaller than the light-emitting duration of the second light-emitting element. By setting the difference between the change rate of the voltage of the ramp signal in the first step signal T1 over time and the change rate of the voltage of the ramp signal in the second step signal T2 over time, the first and second light-emitting elements have different light-emitting durations, satisfying the requirements for the light-emitting durations by the light-emitting elements of different colors.

In some embodiments of the present disclosure, when the voltage change range of the ramp signal S is fixed, the longer the duration of the ramp signal S is, the higher the degree of the adjusting of the light-emitting duration by the ramp signal S. As shown in FIG. 15, the duration of the third ramp signal S3 is smaller than the duration of the ramp signal S4. When the voltage value of the data voltage Data is within the changing range of the third ramp signal S3 and the fourth ramp signal S4, the first step signal T1 is supplied to the pixel circuit coupled to the first light-emitting element, and the second step signal T2 is supplied to the pixel circuit coupled to the second light-emitting element. In this way, the light-emitting duration of the first light-emitting element is smaller than the light-emitting duration of the second light-emitting element. By setting the difference between the duration of the first step signal T1 and the duration of the second step signal T2, the first and second light-emitting elements have different light-emitting durations, satisfying the requirements for the light-emitting durations by the light-emitting elements of different colors.

In some embodiments of the present disclosure, the light-emitting elements 20 include a first light-emitting element and a second light-emitting element of different colors. The step signal T received by the pixel circuit coupled to the first light-emitting element and the step signal T received by the pixel circuit coupled to the second light-emitting element have the same waveform. The first light-emitting element and the second light-emitting element are driven by the same step signal T, so the number of the step signals T in the display panel is reduced, the generation of the step signal T is easier, and the driving mode of the display panel is simplified.

The display panel according to some embodiments of the present disclosure include red light-emitting elements 20, green light-emitting elements 20, and blue light-emitting elements 20. In some embodiments of the present disclosure, the step signal T received by the pixel circuit coupled to the red light-emitting element 20, the step signal T received by the pixel circuit coupled to the green light-emitting element 20, and the step signal T received by the pixel circuit coupled to the blue light-emitting element 20 have the same waveform. That is, the display panel is provided with only one step signal T, which not only simplifies the driving mode of the display panel, but it also reduces the layout of the step signal line in the display panel.

Figure 16:
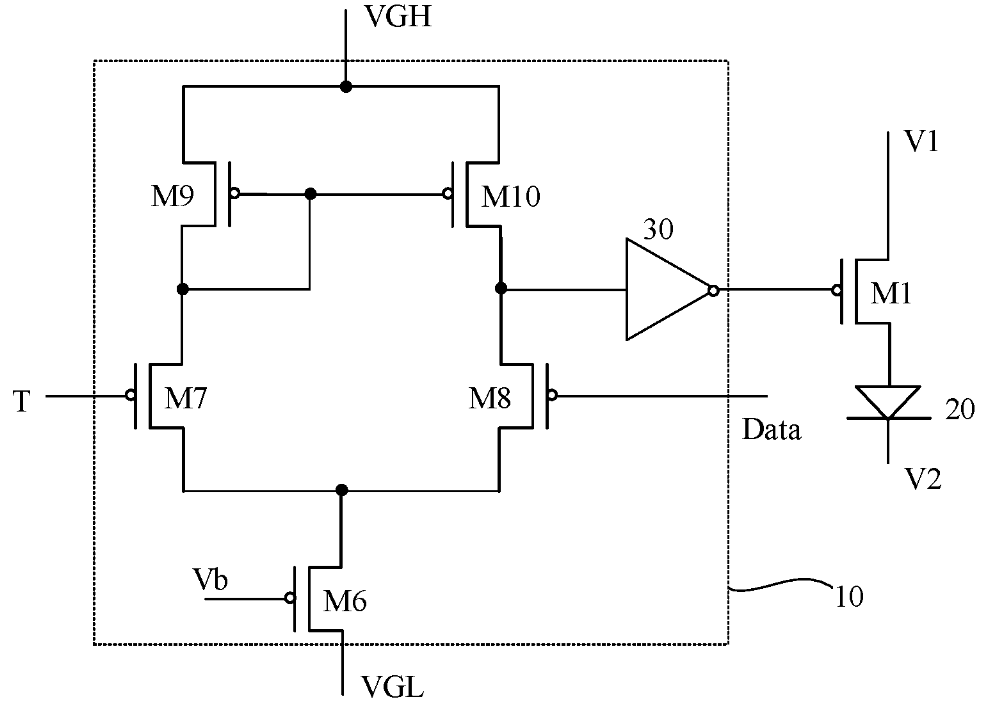
FIG. 16 is a schematic diagram of another pixel circuit according to some embodiments of the present disclosure.

FIG. 16 is a schematic diagram of another pixel circuit according to some embodiments of the present disclosure. In some embodiments of the present disclosure, as shown in FIG. 16, a first voltage terminal of the comparator 10 receives a high-level signal VGH, and a second voltage terminal of the comparator 10 receives a low-level signal VGL. The voltage value of the high-level signal VGH is greater than the voltage value of the low-level signal VHL. When the voltage of the data signal Data is greater than the step signal T, the comparator 10 supplies the low-level signal VGL to the control terminal of the first transistor M1, the first transistor M1 is turned on by the low-level signal VGL, the voltage of the first power supply terminal V1 is applied to the first electrode of the light-emitting element 20 through the turned-on first transistor M1, and the light-emitting element 20 emits light. When the voltage of the data signal Data is smaller than the voltage of the step signal T, the comparator 10 supplies the high-level signal VGH to the control terminal of the first transistor M1, the first transistor M1 is turned off by the high-level signal VGH, and the light-emitting element 20 does not emit light when the first transistor M1 is turned off.

In some embodiments of the present disclosure, the comparator 10 includes a comparator. The comparator may be any structure of the existing comparator. In some embodiments of the present disclosure, as shown in FIG. 16, the comparator 10 includes a sixth transistor M6, a seventh transistor M7, an eighth transistor M8, a ninth transistor M9, a tenth transistor M10, and an inverter 30. A control signal Vb in FIG. 16 is a constant voltage signal, and controls the sixth transistor M6 to be in the turned-on state. The function of the inverter 30 is providing the gain, such that the voltage outputted by the output terminal of the comparator 10 is in the saturated state. In this way, the comparator 10 can output the high-level signal VGH or the low-level signal VGL stably, and the first transistor M1 operates stably.

The above description is made with an example that all transistors in the comparator 10 are P-type transistors. In some embodiments of the present disclosure, all transistors in the comparator 10 are N-type transistors.

In some embodiments of the present disclosure, the comparator 10 includes a switch transistor. One of a gate electrode and a source electrode of the switch transistor receives the data voltage Data, and the other one receives the step signal T. The output at a drain electrode of the switch transistor is controlled by comparing the voltage at the gate electrode and the voltage at the source electrode. The drain electrode of the switch transistor is the output terminal of the comparator 10. The drain electrode of the switch transistor is connected to the control terminal of the first transistor M1.

Figure 17:
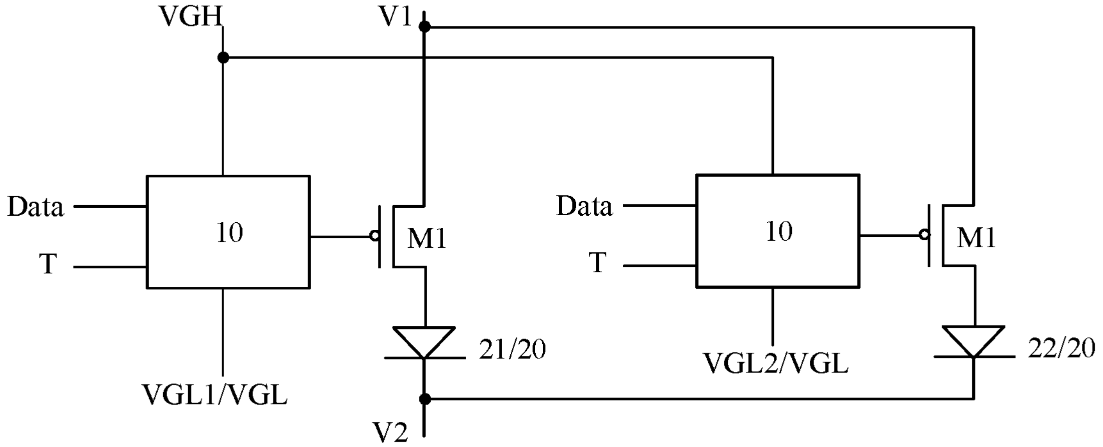
FIG. 17 is a schematic diagram of a circuit of a display panel according to some embodiments of the present disclosure.

FIG. 17 is a schematic diagram of a circuit of a display panel according to some embodiments of the present disclosure. In FIG. 17, the comparator 10 in the pixel circuit is simplified for schematic illustration. In some embodiments of the present disclosure, as shown in FIG. 17, the light-emitting elements 20 include a first light-emitting element 21 and a second light-emitting element 22 of different colors. The light-emitting efficiency of the first light-emitting element 21 is smaller than the light-emitting efficiency of the second light-emitting element 22. The low-level signals VGL includes a first low-level signal VGL1 and a second low-level signal VGL2. The voltage value of the first low-level signal VGL1 is smaller than the voltage value of the second low-level signal VHL2. The comparator 10 in the pixel circuit coupled to the first light-emitting element 21 receives the first low-level signal VGL1, and the comparator 10 in the pixel circuit coupled to the second light-emitting element 22 receives the second low-level signal VGL2. In this embodiment, the comparators 10 in the pixel circuits for driving the light-emitting elements 20 of different colors receive low-level signals VGL of different voltage values. In this way, the first transistors M1 in the pixel circuits for the light-emitting elements 20 of different colors are turned on by different degrees, so the drive currents of these light-emitting elements 20 are different. In this embodiment, the drive currents of the light-emitting elements 20 of different colors are adjusted.

The voltage value of the first low-level signal VGL1 is smaller than the voltage value of the second low-level signal VGL2. In the light-emitting phase, the drive current of the first light-emitting element 21 is greater than the drive current of the second light-emitting element 22. In this way, the light-emitting efficiency difference between the first light-emitting element 21 and the second light-emitting element 22 is compensated.

Figure 18:
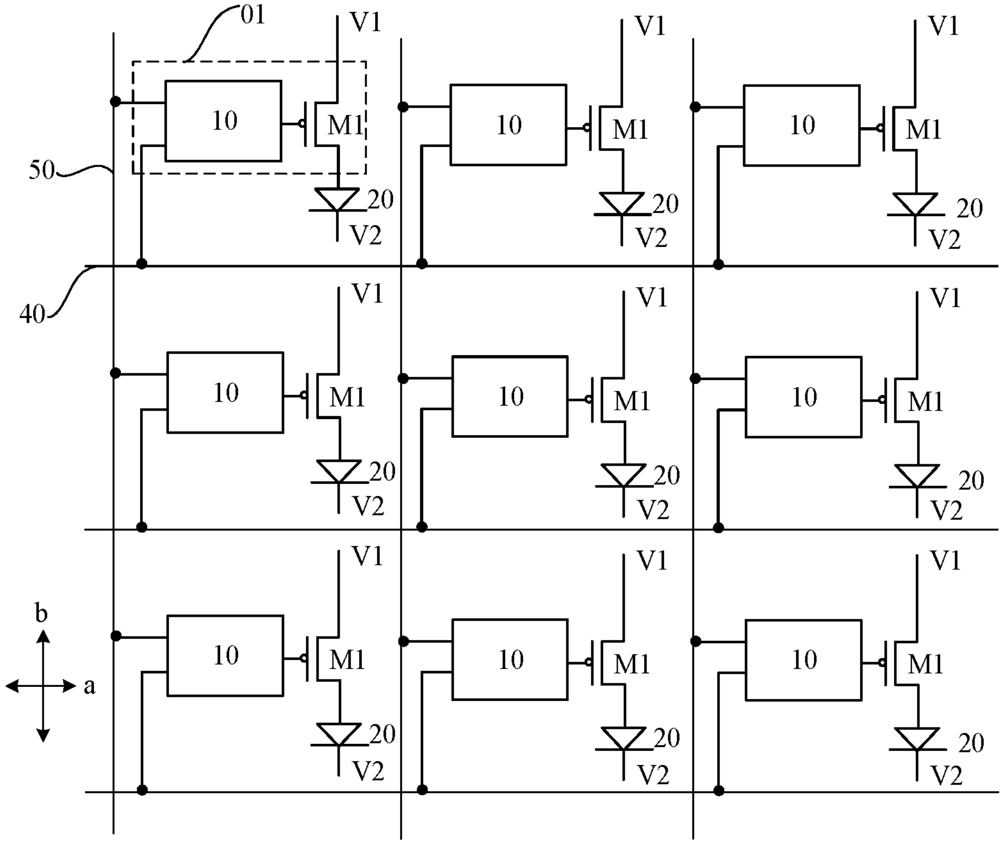
FIG. 18 is a schematic diagram of a circuit of a display panel according to some embodiments of the present disclosure.

FIG. 18 is a schematic diagram of a circuit of a display panel according to some embodiments of the present disclosure. In some embodiments of the present disclosure, as shown in FIG. 18, the display panel further includes step signal lines 40 and data signal lines 50. The step signal line 40 provides the step signal T. The data signal line 50 provides the data signal Data. The step signal line 40 extends along the first direction a. The data signal line 50 extends along the second direction b. The first direction a intersects the second direction b. A plurality of pixel circuits 01 arranged along the first direction are coupled to the same step signal line 40. A plurality of pixel circuits 01 arranged along the second direction are coupled to the same data signal line 50. In this embodiment, the plurality of pixel circuits 01 arranged along the first direction a share the same step signal line 40, and the plurality of pixel circuits 01 arranged along the second direction b share the same data signal line 50, thereby simplifying the wire layout of the display panel.

In some embodiments of the present disclosure, the plurality of pixel circuits 01 arranged along the first direction a are coupled to light-emitting elements 20 of at least two colors. That is, the pixel circuits 01 coupled to the light-emitting elements 20 of at least two colors in the display panel share the step signal T. In this way, the number of the step signals T in the display panel is reduced, the generation of the step signal T is easier, and the driving mode of the display panel is simplified.

Figure 19:
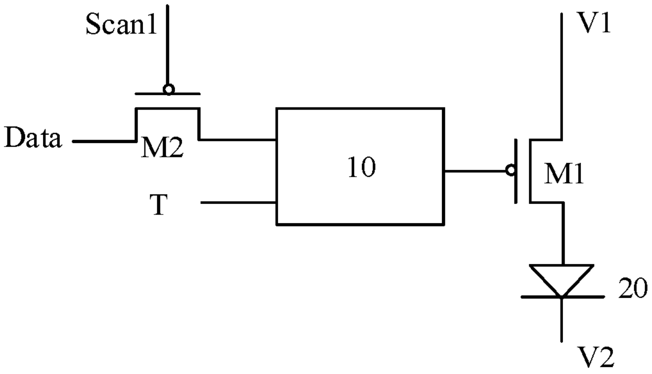
FIG. 19 is a schematic diagram of another pixel circuit according to some embodiments of the present disclosure.

FIG. 19 is a schematic diagram of another pixel circuit according to some embodiments of the present disclosure. In some embodiments of the present disclosure, as shown in FIG. 19, the pixel circuit further includes a second transistor M2. The second transistor M2 includes a control terminal, a first electrode, and a second electrode. The control terminal receives a first scan signal Scan1, the first electrode receives the data signal, and the second electrode is coupled to the first input terminal of the comparator 10. The transistor type of the second transistor M2 is the same as that of the first transistor M1. The first scan signal Scan1 provides an enable signal, the enable signal turns on the second transistor M2, and the data signal Data is supplied to the first input terminal of the comparator 10 through the second transistor M2.

When the second transistor M2 is turned off, the data signal Data is not supplied to the first input terminal of the comparator 10. When the display panel displays an image, different light-emitting elements 20 correspond to different data voltages Data, and the data voltages Data are supplied to the pixel circuits through data signal lines. With the arrangement of the second transistor M2 in the pixel circuit, a plurality of pixel circuits share one data signal line.

Figure 20:
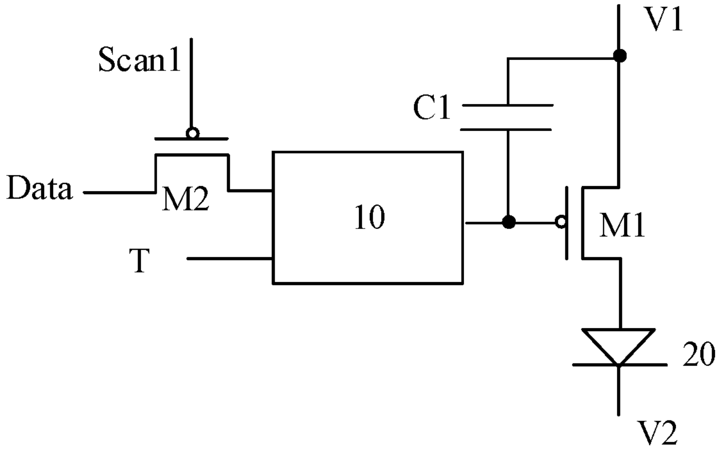
FIG. 20 is a schematic diagram of another pixel circuit according to some embodiments of the present disclosure.

FIG. 20 is a schematic diagram of another pixel circuit according to some embodiments of the present disclosure. In some embodiments of the present disclosure, as shown in FIG. 12, the pixel circuit further includes a first capacitor C1 including a first plate and a second plate. The first plate is coupled to the first power supply terminal V1. The second plate is coupled the control terminal of the first transistor M1. The first capacitor C1 can stabilize the potential at the control terminal of the first transistor M1, ensuring the stable operation of the first transistor M1.

Figure 21:
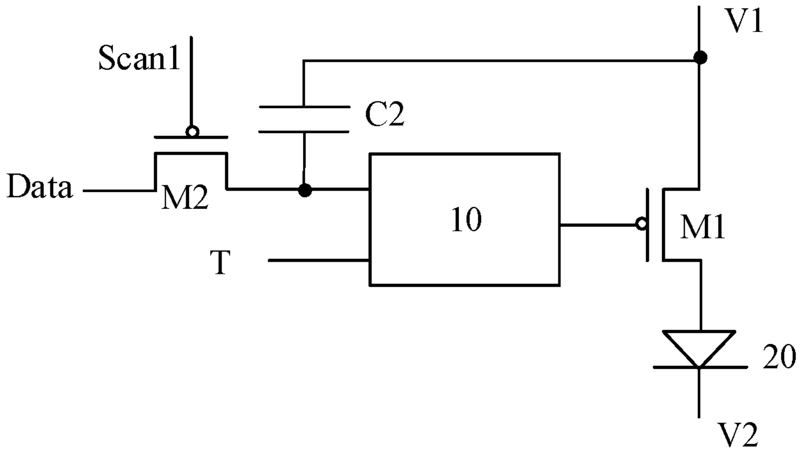
FIG. 21 is a schematic diagram of another pixel circuit according to some embodiments of the present disclosure.

FIG. 21 is a schematic diagram of another pixel circuit according to some embodiments of the present disclosure. In some embodiments of the present disclosure, the pixel circuit further includes a second capacitor C2 including a first plate and a second plate. The first plate is coupled to the first power supply terminal V1. The second plate is coupled to the first input terminal of the comparator 10. The second capacitor C2 can stabilize the potential at the first input terminal of the comparator 10, ensuring the stability of the data voltage Data at the first input terminal of the comparator 10 when the comparator 10 works. In this way, the signal outputted by the output terminal of the comparator 10 is stable.

In some embodiments of the present disclosure, the pixel circuit includes both the first capacitor C1 and the second capacitor C2.

Figure 22:
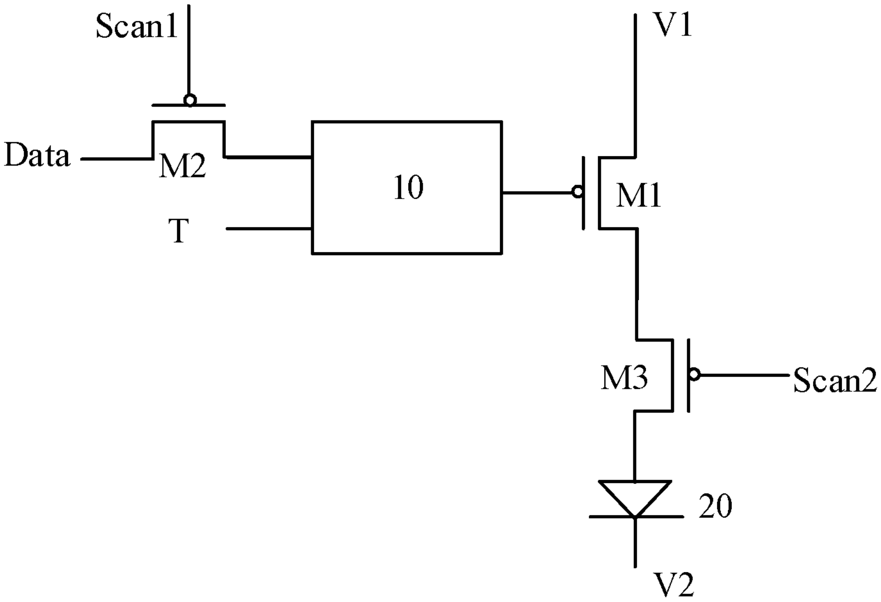
FIG. 22 is a schematic diagram of another pixel circuit according to some embodiments of the present disclosure.

FIG. 22 is a schematic diagram of another pixel circuit according to some embodiments of the present disclosure. In some embodiments of the present disclosure, as shown in FIG. 22, the pixel circuit further includes a third transistor M3. The third transistor M3 is connected between the first transistor M1 and the light-emitting element 20. A control terminal of the third transistor M3 receives a second scan signal Scan2. A pulse width of an enable signal in the second scan signal Scan2 is larger than a pulse width of the enable signal in the first scan signal Scan1. In this embodiment, the first transistor M1 and the third transistor M3 may be turned on simultaneously, such that the voltage of the first power supply terminal V1 is supplied to the light-emitting element 20, and the light-emitting element 20 is driven to emit light. Since the control terminal of the first transistor M1 is connected to the output terminal of the comparator 10, the light-emitting duration of the light-emitting element 20 mainly depends on the turn-on duration of the first transistor M1. The pulse width of the enable signal in the second scan signal Scan2 may be arranged to be equal to the total duration of the light-emitting phase of the pixel circuit. In this way, the turned-on period of the first transistor M1 is within the turned-on period of the third transistor M3, and the light-emitting duration of the light-emitting element 20 can be adjusted by adjusting the turn-on duration of the first transistor M1.

Figure 23:
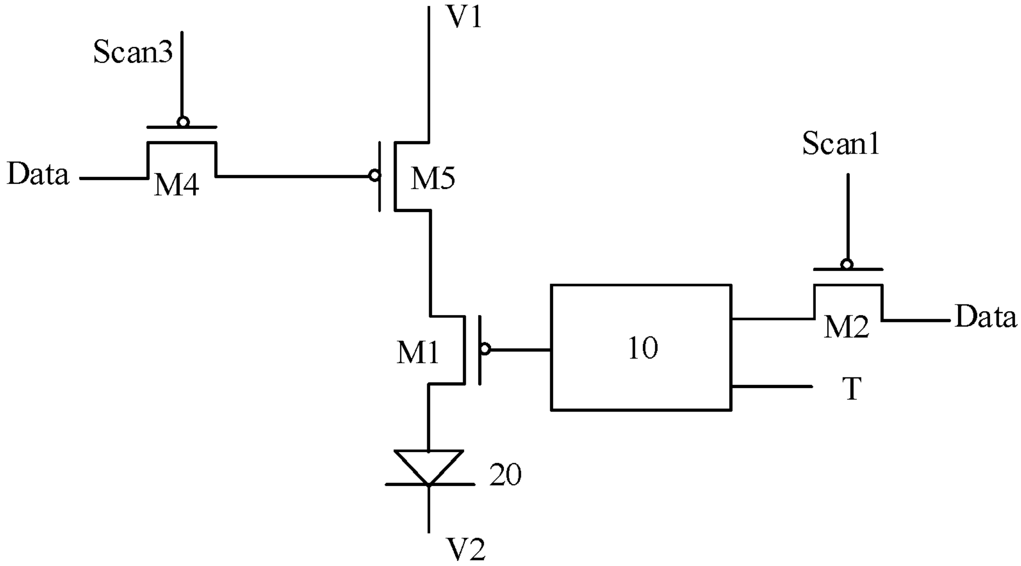
FIG. 23 is a schematic diagram of another pixel circuit according to some embodiments of the present disclosure.

FIG. 23 is a schematic diagram of another pixel circuit according to some embodiments of the present disclosure. In some embodiments of the present disclosure, as shown in FIG. 23, the pixel circuit further includes a fourth transistor M4 and a fifth transistor M5. A control terminal of the fourth transistor M4 receives a third scan signal Scan3. A first electrode of the fourth transistor M4 receives the data signal Data. A second electrode of the fourth transistor M4 is coupled to a control terminal of the fifth transistor M5. The fifth transistor M5 is electrically connected between the first power supply terminal V1 and the first transistor M1. A pulse width of an enable signal in the first scan signal Scan1 is greater than a pulse width of an enable signal in the third scan signal Scan3. In this embodiment, the fifth transistor M5 serves as the drive transistor, and is configured to generate a drive current. The enable signal provided in the third scan signal Scan3 turns on the fourth transistor M4. The data signal Data is supplied to the control terminal of the fifth transistor M5. The fifth transistor M5 generates the drive current based on the data signal Data. When the first transistor M1 is turned on, the drive current is supplied to the light-emitting element 20. Therefore, the light-emitting duration of the light-emitting element 20 depends on the turn-on duration of the first transistor M1. In this embodiment, the data voltage Data is supplied to the first input terminal of the comparator 10 under control of the enable signal in the first scan signal Scan1. The pulse width of the enable signal in the first scan signal Scan1 is larger. For example, the pulse width of the enable signal in the first scan signal Scan1 is equal to the total duration of the light-emitting phase of the pixel circuit. In this way, the data voltage Data is always supplied to the first input terminal of the comparator 10 in the light-emitting phase. That is, the comparator 10 is in the operating state in the whole light-emitting phase. Therefore, the light-emitting duration of the light-emitting element 20 can be adjusted by controlling the turn-on duration of the first transistor M1 using the comparator 10.

In the above embodiments, the transistors are P-type transistors for illustration. The type of the transistor is not limited in the present disclosure.

Figure 24:
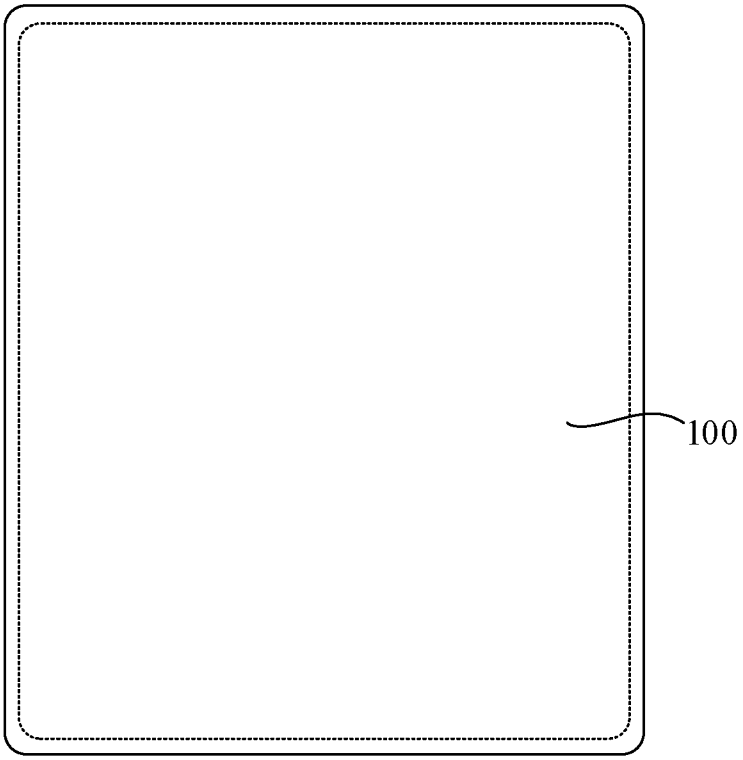
FIG. 24 is a schematic diagram of a display apparatus according to some embodiments of the present disclosure.

Embodiments of the present disclosure further provide a display apparatus. FIG. 24 is a schematic diagram of a display apparatus according to some embodiments of the present disclosure. As shown in FIG. 24, the display apparatus includes the display panel 100 in any embodiment of the present disclosure. The structure of the display panel 100 has been described in the foregoing embodiments, and details are not repeated. The display apparatus provided by embodiment of the present disclosure may be an electronic product having a display function such as a computer, a television, a tablet computer, an e-reader, an on-vehicle display.

A person skilled in the art may clearly understand that, technologies in embodiments of the present disclosure may be implemented by software in addition to a hardware platform. Based on such an understanding, technical solutions of embodiments of the present disclosure may be implemented in a form of a software product. The computer software product is stored in a storage medium, such as a ROM/RAM, a hard disk, or an optical disc, and includes several instructions for instructing a computer device (which may be a personal computer, a server, or a network device) to perform the methods described in embodiments or some parts of embodiments of the present disclosure.

Same or similar parts in embodiments of this specification can refer to each other. An embodiment of an electronic device may be similar to a method embodiment, and therefore may be described briefly. For related parts, refer to descriptions in the method embodiment.

What is claimed is:

1. A display panel, comprising:

light-emitting elements; and pixel circuits, wherein at least one of the pixel circuits comprises a comparator and a first transistor, the first transistor and at least one of the light-emitting elements are electrically connected between a first power supply terminal and a second power supply terminal, and an output terminal of the comparator is coupled to a control terminal of the first transistor, wherein a first input terminal of the comparator receives a data signal, a second input terminal of the comparator receives a step signal, and the comparator is configured to compare a voltage of the data signal with a voltage of the step signal, and supply a comparison result to the control terminal of the first transistor, wherein an operation cycle of the at least one of the pixel circuits comprises a light-emitting phase, wherein in the light-emitting phase, the step signal comprises at least one plateau signal and at least one ramp signal, the at least one plateau signal is a constant-voltage signal, and a voltage of the at least one ramp signal progressively changes over time, and wherein in the light-emitting phase, the step signal comprises n plateau signals and m ramp signals, where n and m are positive integers, n≥2, and m≥2.

2. The display panel according to claim 1, wherein in the light-emitting phase, the step signal satisfies at least one of following conditions:

voltages of the n plateau signals successively increase over time;

the voltages of the n plateau signals successively decrease over time;

the voltages of the n plateau signals successively increase and then successively decrease over time;

the voltages of the n plateau signals successively decrease and then successively increase over time;

the voltages of the n plateau signals successively increase over time, the n plateau signals and the m ramp signals are in one-to-one correspondence, and the at least one ramp signal increases from 0V to the voltage of a corresponding plateau signal; or the voltages of the n plateau signals successively decrease over time, the n plateau signals and the m ramp signals are in one-to-one correspondence, and the at least one ramp signal decreases from the voltage of the corresponding plateau signal to 0V.

3. The display panel according to claim 1, wherein q ramp signals in the m ramp signals are identical to each other in a voltage-time function, where q is a positive integer, and q≤m.

4. The display panel according to claim 3, wherein the q ramp signals comprise a first ramp signal and a second ramp signal, and a duration of the first ramp signal is greater than a duration of the second ramp signal.

5. The display panel according to claim 1, wherein the n plateau signals comprise a first plateau signal and a second plateau signal, and the first plateau signal and the second plateau signal have different voltage values and durations.

6. The display panel according to claim 5, wherein a voltage value of the first plateau signal is greater than a voltage value of the second plateau signal, and a duration of the first plateau signal is smaller than a duration of the second plateau signal.

7. The display panel according to claim 1, wherein the light-emitting elements comprise a first light-emitting element and a second light-emitting element that are different in color, the pixel circuits comprise a first pixel circuit coupled to the first light-emitting element and a second pixel circuit coupled to the second light-emitting element, the step signal comprises a first step signal and a second step signal that have a same waveform, and the first pixel circuit receives the first step signal, and the second pixel circuit receives the second step signal.

8. The display panel according to claim 1, wherein a first voltage terminal of the comparator receives a high-level signal, a second voltage terminal of the comparator receives a low-level signal, and a voltage value of the high-level signal is greater than a voltage value of the low-level signal, and when a voltage of the data signal is greater than a voltage of the step signal, the comparator supplies the low-level signal to the control terminal of the first transistor, and the first transistor is turned on by the low-level signal.

9. The display panel according to claim 8, wherein the light-emitting element comprises a first light-emitting element and a second light-emitting element that are different in color, and a light-emitting efficiency of the first light-emitting element is smaller than a light-emitting efficiency of the second light-emitting element, the pixel circuits comprise a first pixel circuit coupled to the first light-emitting element and a second pixel circuit coupled to the second light-emitting element, the low-level signal comprises a first low-level signal and a second low-level signal, and a voltage value of the first low-level signal is smaller than a voltage value of the second low-level signal, the comparator of the first pixel circuit receives the first low-level signal, and the comparator of the second pixel circuit receives the second low-level signal.

10. The display panel according to claim 1, further comprising: step signal lines and data signal lines, wherein the step signal lines extend along a first direction and provide the step signal, the data signal lines extend along a second direction and provide the data signal, the first direction intersects the second direction, the light-emitting elements arranged along the first direction are coupled to a same step signal line of the step signal lines, and the light-emitting elements arranged along the second direction are coupled to a same data signal line of the data signal lines.

11. The display panel according to claim 1, wherein at least one of the pixel circuits further comprises a second transistor, the second transistor comprises a control terminal, a first electrode and a second electrode, the control terminal receives a first scan signal, the first electrode receives the data signal, and the second electrode is coupled to the first input terminal of the comparator.

12. The display panel according to claim 11, wherein at least one of the pixel circuits further comprises a first capacitor, the first capacitor comprises a first plate and a second plate, the first plate is coupled to the first power supply terminal, and the second plate is coupled to the control terminal of the first transistor, and/or wherein at least one of the pixel circuits further comprises a second capacitor, the second capacitor comprises a first plate and a second plate, the first plate is coupled to the first power supply terminal, and the second plate is coupled to the first input terminal of the comparator.

13. The display panel according to claim 11, wherein at least one of the pixel circuits further comprises a third transistor that is connected between the first transistor and the light-emitting element, and a control terminal of the third transistor receives a second scan signal, wherein a pulse width of an enable signal in the second scan signal is greater than a pulse width of an enable signal in the first scan signal; or at least one of the pixel circuits further comprises a fourth transistor and a fifth transistor, the fourth transistor comprises a control terminal, a first electrode, and a second electrode, the control terminal receives a third scan signal, the first electrode receives the data signal, and the second electrode is coupled to a control terminal of the fifth transistor, the fifth transistor is electrically connected between the first power supply terminal and the first transistor, and the pulse width of the enable signal in the first scan signal is greater than a pulse width of an enable signal in the third scan signal.

14. A display apparatus, comprising: a display panel, wherein the display panel comprises light-emitting elements; and pixel circuits, wherein at least one of the pixel circuits comprises a comparator and a first transistor, the first transistor and the light-emitting element are coupled between a first power supply terminal and a second power supply terminal, and an output terminal of the comparator is coupled to a control terminal of the first transistor, wherein a first input terminal of the comparator receives a data signal, a second input terminal of the comparator receives a step signal, and the comparator is configured to compare a voltage of the data signal with a voltage of the step signal, and supply a comparison result to the control terminal of the first transistor, wherein an operation cycle of at least one of the pixel circuits comprises a light-emitting phase, wherein in the light-emitting phase, the step signal comprises at least one plateau signal and at least one ramp signal, the at least one plateau signal is a constant-voltage signal, and a voltage of the at least one ramp signal progressively changes over time, and wherein in the light-emitting phase, the step signal comprises n plateau signals and m ramp signals, where n and m are positive integers, n≥2, and m≥2.

15. A display panel, comprising:

light-emitting elements; and pixel circuits, wherein at least one of the pixel circuits comprises a comparator and a first transistor, the first transistor and at least one of the light-emitting elements are electrically connected between a first power supply terminal and a second power supply terminal, and an output terminal of the comparator is coupled to a control terminal of the first transistor, wherein a first input terminal of the comparator receives a data signal, a second input terminal of the comparator receives a step signal, and the comparator is configured to compare a voltage of the data signal with a voltage of the step signal, and supply a comparison result to the control terminal of the first transistor, wherein an operation cycle of the at least one of the pixel circuits comprises a light-emitting phase, and wherein in the light-emitting phase, the step signal comprises at least one plateau signal and at least one ramp signal, the at least one plateau signal is a constant-voltage signal, and a voltage of the at least one ramp signal progressively changes over time;

wherein the light-emitting elements comprise a first light-emitting element and a second light-emitting element that are different in color, the pixel circuits comprise a first pixel circuit coupled to the first light-emitting element and a second pixel circuit coupled to the second light-emitting element, the step signal comprises a first step signal and a second step signal that are different in waveform, and the first pixel circuit receives the first step signal, and the second pixel circuit receives the second step signal.

16. The display panel according to claim 15, wherein the at least one plateau signal of the first step signal comprises a third plateau signal, the at least one plateau signal of the second step signal comprises a fourth plateau signal, and the third plateau signal and the fourth plateau signal have a same voltage value and different durations.

17. The display panel according to claim 16, wherein a light-emitting efficiency of the first light-emitting element is greater than a light-emitting efficiency of the second light-emitting element, and a duration of the third plateau signal is smaller than a duration of the fourth plateau signal.

18. The display panel according to claim 15, wherein a number of the at least one plateau signal of the first step signal is equal to a number of the at least one plateau signal of the second step signal, and an $i^{th}$ plateau signal of the at least one plateau signal of the first step signal and an $i^{th}$ plateau signal of the at least one plateau signal of the second step signal have different voltage values, where $i \geq 1$.

19. The display panel according to claim 15, wherein the at least one ramp signal of the first step signal comprises a third ramp signal, and the at least one ramp signal of the second step signal comprises a fourth ramp signal, and wherein a change rate of a voltage of the third ramp signal as a function of time is greater than a change rate of a voltage of the fourth ramp signal as a function of time, and/or, a duration of the third ramp signal is smaller than a duration of the fourth ramp signal.

20. A display apparatus, comprising a display panel according to claim 15.

* * * * *